United States Patent [19]

Owens

[11] Patent Number: 5,458,088
[45] Date of Patent: Oct. 17, 1995

[54] GROOMING PORTAL FOR PETS

[76] Inventor: James L. Owens, 4575 Motorway, Waterford, Mich. 48328

[21] Appl. No.: 287,176

[22] Filed: Aug. 8, 1994

[51] Int. Cl.⁶ ........................................... A01K 13/00
[52] U.S. Cl. ................................................ 119/86
[58] Field of Search ........................ 117/19, 83, 86, 117/15, 165

[56]         References Cited

U.S. PATENT DOCUMENTS

| | | |
|---|---|---|
| 1,568,226 | 1/1926 | Larson . |
| 1,582,144 | 4/1926 | Pflaum . |
| 1,627,516 | 5/1927 | Larson . |
| 2,441,058 | 5/1948 | Carwile . |
| 2,758,646 | 8/1956 | Johnson . |
| 2,832,406 | 4/1958 | Turenne . |
| 2,865,329 | 12/1958 | Elliott . |
| 2,976,841 | 3/1961 | Scheffer . |
| 4,022,226 | 5/1977 | Muenstermann . |
| 4,022,263 | 5/1977 | Beckett et al. . |
| 4,301,766 | 11/1981 | Piccone . |
| 4,350,198 | 9/1982 | Naegeli . |
| 4,407,234 | 10/1983 | Kleman . |
| 4,807,569 | 2/1989 | Leopold . |
| 4,938,169 | 7/1990 | Barmakian . |

FOREIGN PATENT DOCUMENTS

| | | |
|---|---|---|
| 1453979 | 8/1965 | France . |
| 461582 | 6/1928 | Germany . |
| 2177282 | 1/1987 | United Kingdom . |

OTHER PUBLICATIONS

Pet Door USA Catalog of Petdoors USA, Bradenfon, Fla. 34207, pp. 1, 2, 3, 8, 9 & 30 Dated 1992.
2–Way Pet Door Product Literature of Magnadoor Product, Plaza Ent., Inc., Keosauqua, Iowa 52565, 5 pgs. Dated Jan. 1990.

Feline Fantasy Brush Information Literature, M&M Ent. Houston, Tex., 77258 Dated: Jul. 1993, 2 pgs.

Staywell 4/5 Pet Door & Lock Product Literature, Reilor Ltd., Preston, Eng PR2 2DN & Horsham, Pa., 19044 Dated: 1987, 14 pgs.

Staywell Product Literature of Reilor, Ltd., Preston England PR2 2DN & Horsham, Pa., 19044, Dated: 1987, 14 pgs.

*Primary Examiner*—Gene Mancene
*Assistant Examiner*—Thomas Price
*Attorney, Agent, or Firm*—Peter D. Keefe

[57]          ABSTRACT

A grooming portal for being connected with an interior door of a dwelling composed generally of an arch shaped decorative frame which is mounted with respect to an arch shaped opening cut in the interior door contiguous the bottom end thereof and a brush having a flexible backing removably mounted to the frame. When mounted to the frame, the brush provides a plurality of bristles which face radially toward, and project into, the passageway defined by the grooming portal. The frame is decorative, thereby enhancing the look of the interior door. The flexible backing frictionally and/or snappingly fits into the frame and is as wide as the door thickness so as to provide an interior framing for a hollow core or a solid core interior door. A preferred flexible backing material is plastic. It is preferred for the flexible backing to be adjustably mountable to the frame to thereby accommodate the particular size of the user's pet.

8 Claims, 2 Drawing Sheets

GROOMING PORTAL FOR PETS

BACKGROUND OF THE INVENTION

1. Field of the Invention

The present invention relates to portals and grooming devices for pets, and more particularly to combined grooming devices and portals for pets. Still more particularly, the present invention relates to a pet portal located in an interior door having mounted with respect thereto a removable pet grooming brush.

2. Description of the Prior Art

One chore that pet owners must contend with on a regular basis is serving as an obedient "door-man" for their pet whenever the pet wishes to go out or come in. To solve this problem, pet portals have been developed which allow the pet on its own initiative to ingress and egress the home. In this regard, portals for pets, such as dogs and cats, have been devised in the form of small doors mounted in an exterior door of a home, wherein the pet is able to gain ingress and egress by pushing against a pivotable flap or flaps. The flap or flaps are necessary in order to keep adverse weather from entering into the dwelling. Examples of such portals are described in U.S. Pat. Nos. 2,758,646, 2,832,406, 4,022,263, and 4,350,198, as well as in French Patent 1,453,979.

Another chore that pet owners must endure is the endless need to groom their pet to ensure that its coat is soft and free of burrs and mats. Ordinarily this is accomplished by brushing the hair of the pet by hand. However, many pets, especially cats, are well known for their innate grooming habits. Accordingly, various stand alone grooming devices have been devised having one or more brushes against which a cat may rub to thereby groom itself. Some of these devices include arch shapes through which the pet walks, and in so doing accomplishes self-grooming. Examples of such devices are disclosed in U.S. Pat. Nos. 1,568,226, 1,582,144, 1,627,516, 2,865,329, and 2,976,841.

Hybrids of the above are also known, such as pet portals into dog houses or boxes, wherein the portal is equipped with a pet grooming brush. Examples of such structures are disclosed in U.S. Pat. No. 4,301,766, U.K. Patent Application 2,177,282A, and German Patent 461,582. Also in this regard, U.S. Pat. No. 4,938,169 discloses a pet portal formed in a wall or door, wherein triangularly shaped flexible flaps mounted to a frame connected with the wall or door are equipped with a plurality of bristles which rub against the body of a pet as the pet passes therethrough.

Another problem that is experienced by cat owners is that after their cat has completed using its litter box, the cat tends to track the granular litter material all through the home. Also, the litter box tends to become odoriferous in relatively a short time of use, and it would be nice to be able to place the litter box in an out of the way room, such as a basement laundry room. Problematically, though, the cat would be unable to pass through the closed door. So, cat owners must leave the litter box out in the open for ready access by their cat, with consequential odor and granular litter material tracking being also unrestricted.

Thus, what remains needed is a pet portal having a decorative frame mounted to an interior door, wherein a pet grooming brush is removably mounted with respect to the frame.

SUMMARY OF THE INVENTION

The present invention is a grooming portal for pets characterized by a decorative frame mounted to an interior door and a pet grooming brush removably mounted with respect to the frame.

The grooming portal according to the present invention is composed generally of an arch shaped decorative frame which is mounted with respect to an opening cut in an interior door of a dwelling and a brush having a flexible backing removably mounted to the frame. When mounted to the frame, the brush provides a plurality of bristles which face radially toward, and project into, the portal. The frame is decorative, thereby enhancing the look of the interior door.

The flexible backing frictionally and/or snappingly fits into the frame and is as wide as the door so as to provide an interior framing for a hollow core interior door. A preferred backing material is plastic. It is preferred for the flexible backing to be adjustably mountable to the frame to thereby accommodate the particular size of the user's pet.

In operation, the user would cut a generally arch shaped opening in an interior door contiguous the bottom end thereof, then install the frame thereat using mounting fasteners. Finally, the user would place the flexible backing into a recess formed in the frame to thereby provide a passageway through the interior door. In the case of a pet cat, it is preferred that the selected interior door be one behind which is located the cat's litter box. Accordingly, the door can remain closed to help retain odors in the closed space behind the door, and the cat will naturally groom off any loose granular litter material as the cat passes through the grooming portal.

Accordingly, it is an object of the present invention to provide a grooming portal for a pet that is installed on an interior door.

It is an additional object of the present invention to provide a grooming portal having a brush which includes a flexible backing that is removably connected with a frame to thereby allow periodic removal, cleaning, and then reconnection with the frame.

It is another object of the present invention to provide a grooming portal having a decorative frame.

It is a further object of the present invention to provide a grooming portal for an interior door, wherein the brush component thereof serves as an interior framing for a hollow core interior door.

It is yet another object of the present invention to provide a grooming portal having a brush which includes a flexible backing that is removably connected with a frame to thereby allow periodic removal, cleaning, and then reconnection with the frame, wherein the brush is adjustable with respect to the frame to thereby accommodate pets of different sizes.

These, and additional objects, advantages, features and benefits of the present invention will become apparent from the following specification.

DETAILED DESCRIPTION OF THE PREFERRED EMBODIMENT

Figure 1:
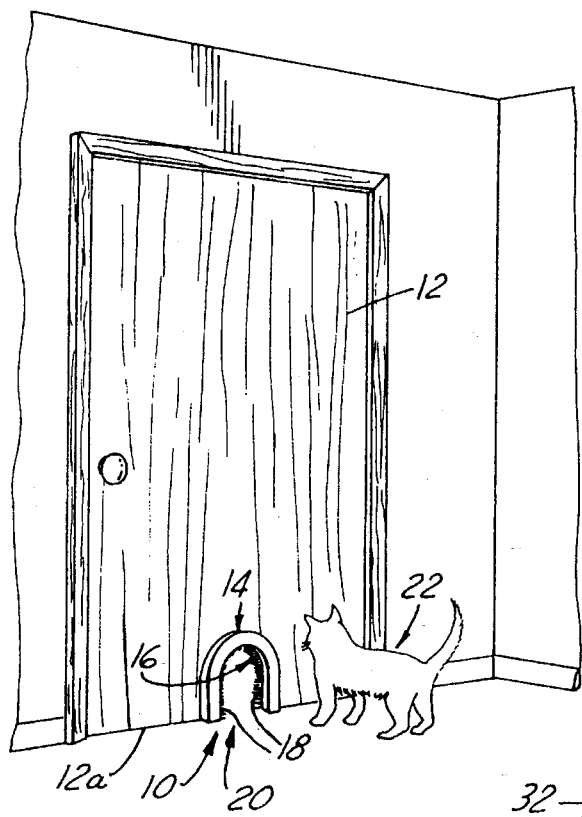
FIG. 1 is a perspective view of the grooming portal according to the present invention, seen in operation in connection with an interior door.

Referring now to the Drawing, FIG. 1 shows the grooming portal 10 according to the present invention, shown in operation with respect to an interior door 12 of a dwelling. As can be discerned from FIG. 1, the grooming portal 10 is characterized by a frame 14, preferably being decorative in design so as to thereby enhance the visual presentation of the interior door 12, and a brush 16 having bristles 18 which radially project into the passageway 20 defined by the grooming portal. The passageway 20 is of an arch shape which opens at the bottom end 12a of the interior door 12. The overall dimensions of the passageway 20 is predetermined to accommodate the size of the pet using the grooming portal 10, as exemplified in FIG. 1 with respect to a cat 22. In this regard, the bristles 18 are positioned so as to rub against the fur of the cat 22 as the cat passes through the passageway 20 in either direction. As the cat 22 passes therethrough, shedding hair is removed from the cat, and in the event the cat's litter box is located behind the interior door 12, as the cat passes through the opening after doing its business, any litter granules on the cat also be removed from its fur.

The structure and function of the grooming portal 10 now be detailed with greater specificity with attention being additionally directed to FIGS. 2 through 8.

Figure 2:
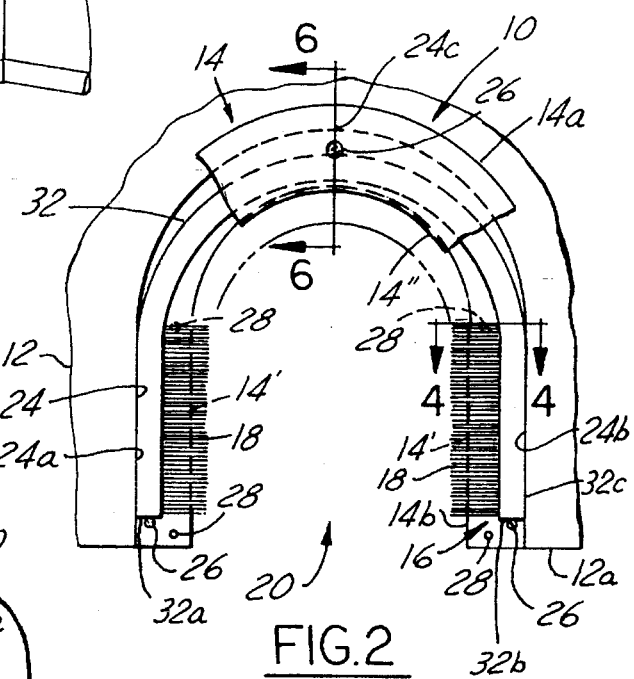
FIG. 2 is a partly broken-away front view of the grooming portal according to the present invention, seen installed with respect to an interior door, and seen adjusted for larger size pets.
Figure 3:
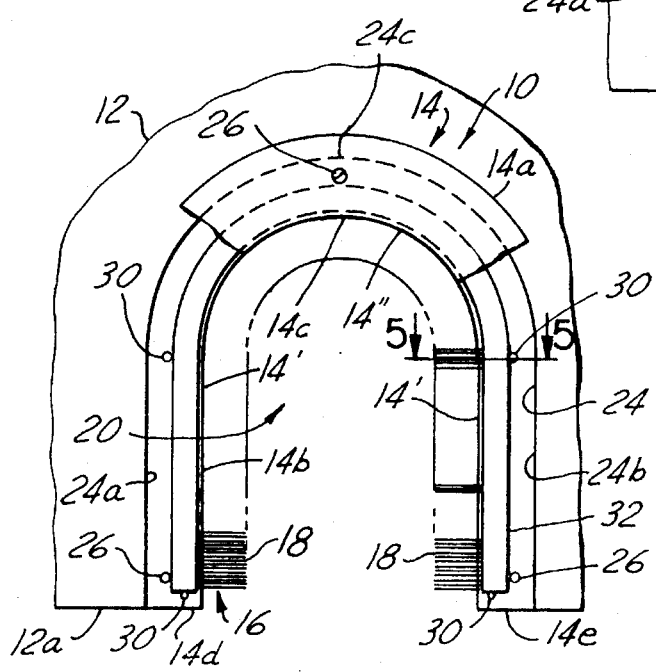
FIG. 3 is a partly broken-away front view of the grooming portal according to the present invention, seen installed with respect to an interior door, and seen adjusted for smaller size pets.

As can be understood from FIGS. 2 and 3, the interior door 12 is provided with an arch shaped opening cut contiguous with the bottom end 12a thereof, such as by a saw or another tool for this purpose, thereby resulting in an arch shaped door edge 24. In the case of a hollow core interior door, the arch shaped door edge 24 is formed in the first and second side walls 12a, 12b thereof (see FIG. 4). An example of an arch shaped opening for the purpose of interfacing with a grooming portal 10 for a cat, the vertical portions 24a, 24b of the arch shaped door edge 24 are about 4 inches in length and are mutually separated by about eight inches, and the location of the apex 24c of the door edge is separated from the bottom end 12a of the interior door 12 a distance of about eight inches.

As can further be understood from FIGS. 2 and 3, the frame 14 of the grooming portal 10 is sized to follow and cover the aforesaid arch shaped door edge 24. The frame 14 is constructed of first and second frame members 14a, 14b which are located on opposing sides of the interior door 12. Each of the first and second frame members 14a, 14b define an arch shaped portal characterized by a curvilinear portion 14" and a linear portion 14' confined thereto on either side thereof. When installed on the interior door 12, the arch shaped portals are mutually superposed and are further superposed with the arch shaped opening as defined by the arch shaped door edge 24. Each of the first and second frame members 14a, 14b are preferably fancifully shaped to present a pleasing decor in association with the interior door 12. Either or both the first and second frame members 12a, 12b may be of wood, plastic, another material, or some combination such as the first frame member on the outside facing side of the door being wood that is beautifully stained or painted, while the interior side of the interior door (such as for example the side facing the interior of a laundry room) is plastic.

Figure 6:
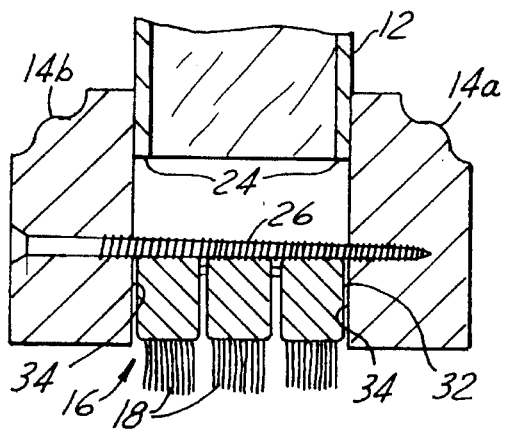
FIG. 6 is a partly sectional view seen along line 6—6 in FIG. 2.

The first and second frame members 14a, 14b are mutually connected together by interconnection means, as for example preferably by screws 26 which engage each of the first and second frame members to thereby provide a fixed separation therebetween, which separation is the width of the interior door 12, as depicted in FIG. 6. In this regard, three screws 26 are preferred, one adjacent the apex 14c of the curvilinear portion 14" of each of the frame members 14a, 14b, and one for each of the linear portions 14' adjacent the terminal ends 14d, 14e of the first and second frame members. The screws 26 cause each of the first and second frame members 14a, 14b to be pressed tightly together against the interior door 12, thereby providing means for affixing the frame 14 with respect to the interior door so that the arch shaped portals thereof are superposed with the arch shaped opening as defined by the arch shaped door edge 24.

Figure 4:
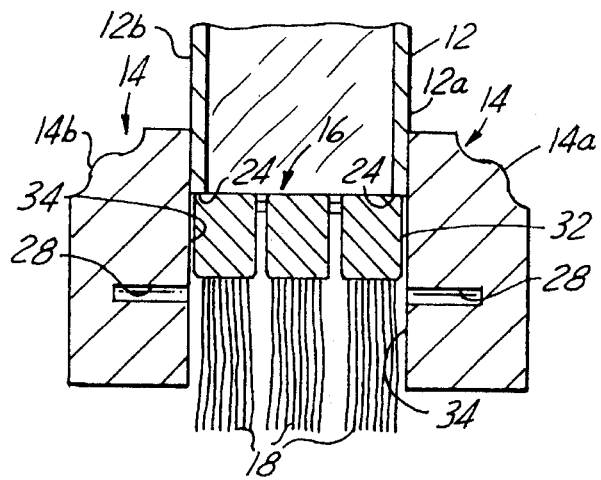
FIG. 4 is a partly sectional view seen along line 4—4 in FIG. 2.
Figure 5:
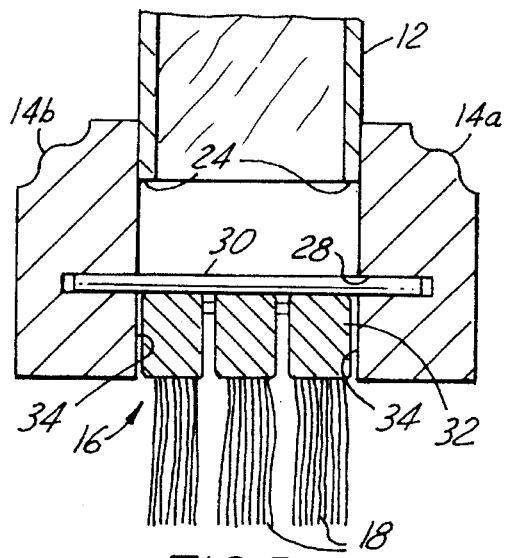
FIG. 5 is a partly sectional view seen along line 5—5 in FIG. 3.

The first and second frame members 14a, 14b are further provided with dowel holes 28 into which dowels 30 may be placed, as comparatively shown in FIGS. 4 and 5. Preferably, four dowel placements are provided, one substantially adjacent each of the two junctures between the upright portions 14' and the curvilinear portion 14" of the first and second frame members 14a, 14b, and one substantially adjacent each of the two terminal ends 14d, 14e of the frame members, as shown in FIGS. 2 and 3. The screws 26 and the dowels 30 serve as abutment members which exemplify abutment means for locating the brush 16 with respect to the frame 14. In this regard, and as shown in FIGS. 2 and 3, the screws 26 are located substantially a first predetermined distance from the first and second arch shaped portals, and the dowels 30 are located substantially a second predetermined distance from the first and second arch shaped portals, wherein the second predetermined distance is less than the first predetermined distance by preferably about one-half the thickness of the flexible backing. Also in this regard, the dowels 30 located adjacent the first and second terminal ends 14d, 14e are positioned closer to the first and second terminal ends, respectively, than are the adjacent screws 26. These screw and dowel placements provide abutment members which exemplify abutment means that interact with the brush 16 to provide adjustable fitting of the brush with respect to the frame 14, as elaborated hereinbelow operationally with respect to a "fat cat" and a "normal cat".

The brush 16 is composed of bristles 18 which are connected to a flexible backing 32 having a first end 32a and a second end 32b. As can be discerned from FIGS. 4 through 6, the width of the flexible backing 32, as measured transversely across the rear side 32c, is about the same as the thickness of the interior door 12. Accordingly, the rear side 32c of the flexible backing 32 abuts, or is abuttable with respect to, the arch shaped door edge 24. That is, when the flexible backing 32 is placed into a recess 34 formed between the first and second frame members 14a, 14b at the arch shaped portals thereof, the depth of the recess being defined by the location of the abutment members, the flexible backing will not fall into the hollow core of the interior door, but will instead abut the abutment members in the form of the arch shaped door edge 24, the screws 26 and/or the dowels 30. An example of a preferred brush 16 is formed from modification of a commercially available brush of Empire Brushes, Inc., Greenville, N.C., FLEX SCRUB (trademark of Empire Brushes, Inc.), model no. 49-0033.

In operation with respect to "fat cats", the arch shaped opening, as defined by the arch shaped door edge 24, is formed in the interior door 12. Next, the first and second arch shaped portals are superposed with the arch shaped door edge and then the first and second frame members 14a, 14b are connected together by screws 26 such that the frame is securely held in place with respect to the interior door. Next, the flexible backing is flexibly pushed into the recess 34 until it selectively abuts the arch shaped door edge as shown in FIG. 2, wherein the opposite ends 32a, 32b of the flexible backing 32 each abut a screw 26 and the mid-point, which serve as second and third abutment members, of the flexible backing abuts the screw adjacent the apex 14c.

An example of means for selectively retaining the flexible backing in the recess is provided by the fit of the flexible backing with respect to the abutment members in the form of the screws and the arch shaped door edge 24, as well as with respect to the recess, causes the flexible backing to be resiliently compressed snappingly into a retained position with respect to the frame until removed therefrom by a user. In addition or alternatively, the flexible backing may be frictionally pressed into the recess where it will remain until removed by a user. The bristles 18 will project into the passageway 20 a distance of about three-quarter inches at the upright portions and about one inch at the apex.

In operation with respect to "normal cats", the arch shaped opening, as defined by the arch shaped door edge 24, is formed in the interior door 12. Next, the first and second arch shaped portals are superposed with the arch shaped door edge, the dowels 30 are aligned with respect to the dowel holes 28, and then the first and second frame members 14a, 14b are connected together by screws 26 such that the frame is securely held in place with respect to the interior door. Next, the flexible backing is flexibly pushed into the recess 34 formed by the first and second frame members until the second end 32c thereof abuts each of the screws 26, which serve as first, second and third abutment members and abuts the dowels adjacent the juncture between the upright portions 14' and curvilinear portion 14" of the first and second frame members, as shown in FIG. 2, wherein the opposite ends of the flexible backing each abut a dowel, which serves as fourth and fifth first abutment members, adjacent the terminal ends 14d, 14e. The fit of the flexible backing with respect to the abutment members in the form of the screws 26 and the dowels 30, as well as with respect to the recess, causes the flexible backing to be resiliently compressed snappingly into a retained position with respect to the frame until removed therefrom by a user. In addition or alternatively, the flexible backing may be frictionally pressed into the recess where it will remain until removed by a user. The bristles 18 will project into the passageway 20 a distance of about one inch.

In either operational scenario, it is to be understood that the the arch shaped portals of each of the first and second frame members 14a, 14b in combination with the brush 16, which is generally conterminous therewith when placed in the recess, form a passageway through the interior door 12. As the cat (or other pet) passes through the passageway 20, the fur of the cat will be brushed by the bristles, thereupon removing shedding hair and litter box granules.

Figure 7:
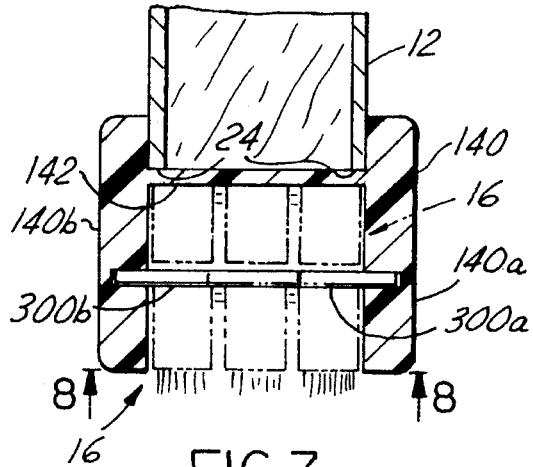
FIG. 7 is a partly sectional view of a single piece frame seen from a vantage point similar to that of FIGS. 4 and 5.
Figure 8:
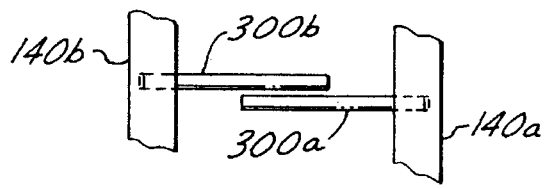
FIG. 8 is a partly broken away view seen along line 8—8 in FIG. 7.

FIGS. 7 and 8 show an alternative frame embodiment, wherein the frame 140 is constructed of a single piece of material, such as for example plastic. In this regard, one or more cross-members 142 are provided which join together first and second frame members 140a, 140b and further serve as a locating abutment with respect to the arch shaped door edge 24. In this embodiment, dowels 300a, 300b are used in place of the aforementioned dowels 30 and screws 26, and since the first and second frame members are fixedly held together at the header 142, the dowels are shortened, connect into one or the other of the first and second frame members and are offset (as depicted in FIG. 8) so as to provide full support for the flexible backing of the brush 16. Since now the first and second frame members are fixed in relation to one another, the frame is slid into the arch shaped cut in the interior door from the bottom end thereof.

To those skilled in the art to which this invention appertains, the above described preferred embodiment may be subject to change or modification. For example, while screws 26 are a preferred form of fastener, other fasteners, such as a snap fastener, may be used therefor. Further for example, the type of abutment members used may be other than screws or dowels, and may include internal components of the door between the first and second sides thereof; the exact placement of the abutment members may be other than that as described and depicted herein, while yet serving the function thereof as generally described and depicted herein. Also, the separation between the first and second frame members is such as to accommodate the interior door thickness, which thickness may vary from interior door to interior door. Further, the interior door while having first and second side walls, may or may not be hollow. Such change or modification can be carried out without departing from the scope of the invention, which is intended to be limited only by the scope of the appended claims.

What is claimed is:

1. A grooming portal for being connected with an interior door of a dwelling, the interior door being provided with an arch shaped opening defined by an arch shaped door edge formed in at least a first side wall and a second side wall thereof, said grooming portal being mountable with respect to the interior door at said arch shaped opening thereof to thereby provide a passageway for a pet to pass through the interior door, fur of the pet being groomed as the pet passes through said grooming portal, said grooming portal comprising:

a frame having a first frame member and a second frame member, said first frame member having an arch shape defining a first arch shaped portal, said second frame member having an arch shape defining a second arch shaped portal dimensionally similar to said first arch shaped portal;

interconnection means for holding said first frame member at a fixed distance with respect to said second frame member, wherein said first and second arch shaped portals are mutually superposed;

means for affixing said frame with respect to a door;

abutment means located between said first and second frame members for defining, in combination with said first and second frame members, a recess at said first and second arch shaped portals;

a brush comprising:
a flexible backing having a first side, an opposite second side, a first end and an opposite second end, said first and second sides having a width substantially equal to said fixed distance; and a plurality of bristles extending radially outward from said first side of said flexible backing, said abutment means locating said flexible backing with respect to said frame so that said plurality of bristles project at least one selected distance into said passageway when said flexible backing is seated in said recess; wherein when said flexible backing is placed in said recess said brush in combination with said first and second arch shaped portals define a passageway; and means for selectively retaining said flexible backing in said recess.

2. The grooming portal of claim 1, wherein said brush is substantially conterminous said first and second portals when said flexible backing is placed in said recess.

3. The grooming portal of claim 1, wherein said first and second arch shaped portals each comprise a curvilinear portion and first and second linear portions conjoining said curvilinear portion, said curvilinear portion having an apex, said first and second frame members having a first terminal end and a said second terminal end; said abutment means comprising:

a first abutment member located adjacent said apex, said first abutment member being spaced a first predetermined distance from said first and second arch shaped portals;

a second abutment member located adjacent said first terminal end, said second abutment member being spaced substantially said first predetermined distance from said first and second arch shaped portals; and a third abutment member located adjacent said second terminal end, said third abutment member being spaced substantially said first predetermined distance from said first and second arch shaped portals;

wherein when said flexible backing is seated in said recess, said second abutment member abuts said first end of said flexible backing, said third abutment member abuts said second end of said flexible backing, and said first abutment member abuts said second side of said flexible backing.

4. The grooming portal of claim 1, wherein said first and second arch shaped portals each comprise a curvilinear portion and first and second linear portions conjoining said curvilinear portion, said curvilinear portion having an apex, said first and second frame members having a first terminal end and a said second terminal end; said abutment means comprising:

a first abutment member located at said apex, said first abutment member being spaced a first predetermined distance from said first and second arch shaped portals;

a second abutment member located adjacent said first terminal end, said second abutment member being spaced substantially said first predetermined distance from said first and second arch shaped portals;

a third abutment member located adjacent said second terminal end, said third abutment member being spaced substantially said first predetermined distance from said first and second arch shaped portals;

a fourth abutment member located adjacent said second abutment member, wherein said fourth abutment member is spaced closer to said first and second arch shaped portals than said second abutment member and wherein said fourth abutment member is spaced closer to said first terminal end than said second abutment member;

a fifth abutment member located adjacent said third abutment member, wherein said fifth abutment member is spaced closer to said first and second arch shaped portals than said third abutment member and wherein said fifth abutment member is spaced closer to said second terminal end than said third abutment member;

a sixth abutment member located substantially at the conjoinder of said curvilinear portion with said first linear portion, said sixth abutment member being spaced from said first and second portals a second predetermined distance; and a seventh abutment member located substantially at the conjoinder of said curvilinear portion with said second linear portion, said seventh abutment member being spaced from said first and second portals substantially said second predetermined distance;

wherein when said flexible backing is seated in said recess, said first end of said flexible backing abuts said second abutment member, said second end of said flexible backing abuts said third abutment member, and said first, fourth, fifth, sixth, and seventh abutment members abut said second side of said flexible backing.

5. An interior door of a dwelling provided with a grooming portal, comprising:

an interior door having a bottom end, a first side wail and a second side wall, said interior door having an arch shaped opening contiguous said bottom end, said arch shaped opening being defined by an arch shaped door edge formed in at least said first and second side walls;

a frame having a first frame member and a second frame member, said first frame member having an arch shape defining a first arch shaped portal, said second frame member having an arch shape defining a second arch shaped portal dimensionally similar to said first arch shaped portal;

interconnection means for holding said first frame member at a fixed distance with respect to said second frame member, wherein said first and second arch shaped portals are mutually superposed;

means for affixing said frame with respect to said interior door, wherein said arch shaped opening and said first and second arch shaped portals are superposed;

abutment means located between said first and second frame members for defining, in combination with said first and second frame members, a recess at said first and second arch shaped portals;

a brush comprising:

a flexible backing having a first side, an opposite second side, a first end and an opposite second end, said first and second sides having a width substantially equal to said fixed distance; and a plurality of bristles extending radially outward from said first side of said flexible backing, said abutment means locating said flexible backing with respect to said frame so that said plurality of bristles project at least one selected distance into said passageway when said flexible backing is seated in said recess;

wherein when said flexible backing is placed in said recess said brush in combination with said first and second arch shaped portals define a passageway; and means for selectively retaining said flexible backing in said recess.

6. The grooming portal of claim 5, wherein said brush is substantially conterminous said first and second portals when said flexible backing is placed in said recess.

7. An interior door provided with a grooming portal of claim 5, wherein said first and second arch shaped portals each comprise a curvilinear portion and first and second linear portions conjoining said curvilinear portion, said curvilinear portion having an apex, said first and second frame members having a first terminal end and a said second terminal end; said abutment means comprising:

a first abutment member located adjacent said apex, said first abutment member being spaced a first predetermined distance from said first and second arch shaped portals;

a second abutment member located adjacent said first terminal end, said second abutment member being spaced substantially said first predetermined distance from said first and second arch shaped portals; and a third abutment member located adjacent said second terminal end, said third abutment member being spaced substantially said first predetermined distance from said first and second arch shaped portals;

wherein when said flexible backing is seated in said recess, said second abutment member abuts said first end of said flexible backing, said third abutment member abuts said second end of said flexible backing, said first abutment member abuts said second side of said flexible backing, and said arch shaped door edge abuts a portion of said second side of said flexible backing substantially adjacent said second and third abutment members.

8. An interior door provided with a grooming portal of claim 5, wherein said first and second arch shaped portals each comprise a curvilinear portion and first and second linear portions conjoining said curvilinear portion, said curvilinear portion having an apex, said first and second frame members having a first terminal end and a said second terminal end; said abutment means comprising:

a first abutment member located at said apex, said first abutment member being spaced a first predetermined distance from said first and second arch shaped portals;

a second abutment member located adjacent said first terminal end, said second abutment member being spaced substantially said first predetermined distance from said first and second arch shaped portals;

a third abutment member located adjacent said second terminal end, said third abutment member being spaced substantially said first predetermined distance from said first and second arch shaped portals;

a fourth abutment member located adjacent said second abutment member, wherein said fourth abutment member is spaced closer to said first and second arch shaped portals than said second abutment member and wherein said fourth abutment member is spaced closer to said first terminal end than said second abutment member;

a fifth abutment member located adjacent said third abutment member, wherein said fifth abutment member is spaced closer to said first and second arch shaped portals than said third abutment member and wherein said fifth abutment member is spaced closer to said second terminal end than said third abutment member;

a sixth abutment member located substantially at the conjoinder of said curvilinear portion with said first linear portion, said sixth abutment member being spaced from said first and second portals a second predetermined distance; and a seventh abutment member located substantially at the conjoinder of said curvilinear portion with said second linear portion, said seventh abutment member being spaced from said first and second portals substantially said second predetermined distance;

wherein when said flexible backing is seated in said recess, said first end of said flexible backing abuts said second abutment member, said second end of said flexible backing abuts said third abutment member, and said first, fourth, fifth, sixth, and seventh abutment members abut said second side of said flexible backing.

* * * * *